April 8, 1969
W. T. EPPLER
3,436,954
METHOD AND APPARATUS FOR CALIBRATING A
CABLE MEASURING DEVICE
Filed Aug. 23, 1966
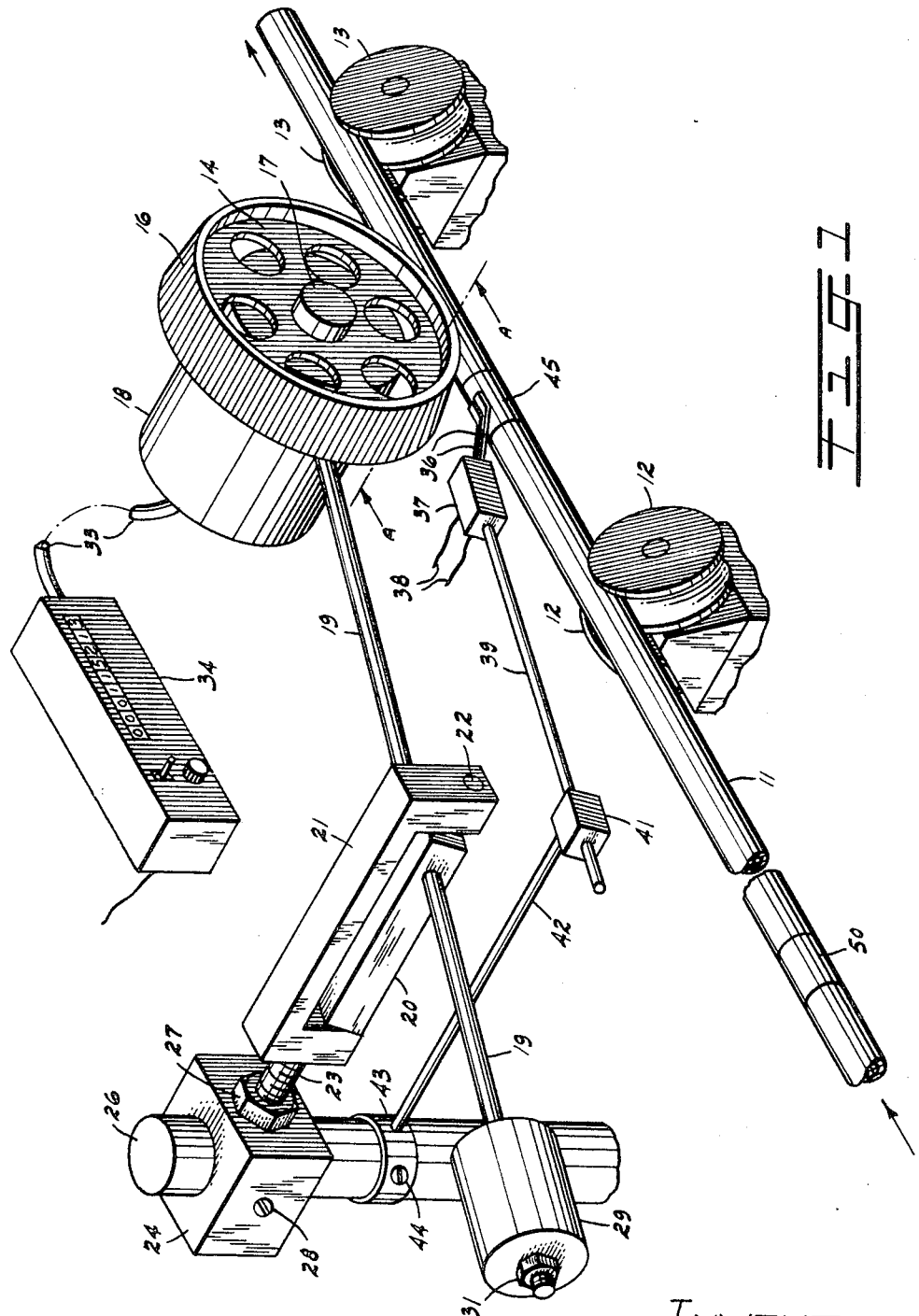
INVENTOR
W.T. EPPLER
BY A.J. Nugent
ATTORNEY

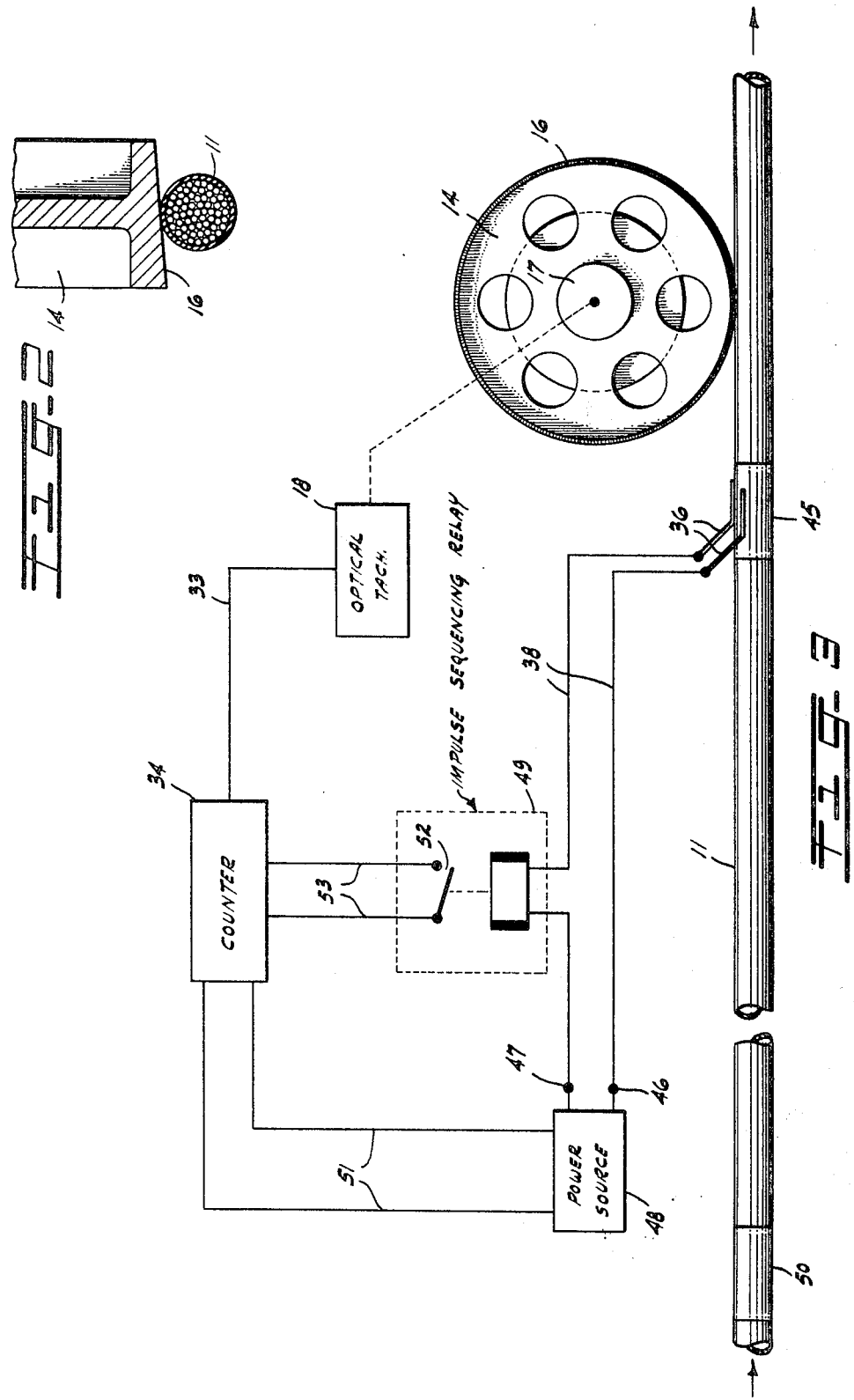

United States Patent Office 3,436,954
Patented Apr. 8, 1969

3,436,954
METHOD AND APPARATUS FOR CALIBRATING A CABLE MEASURING DEVICE
Walter T. Eppler, Cranford, N.J., assignor to Western Electric Company, Incorporated, New York, N.Y., a corporation of New York
Filed Aug. 23, 1966, Ser. No. 574,330
Int. Cl. G01c 25/00
U.S. Cl. 73—1  7 Claims

ABSTRACT OF THE DISCLOSURE

A method of and apparatus for calibrating a counter for measuring the length of an advancing cable wherein a pair of metal bands are applied at spaced points to the outer plastic sheath of the cable and the cable rides over a counter wheel having a tapered circumferential periphery. The leading metal band engages a switch to send a start signal to the counter and the following metal band engages the switch to send a stop signal to the counter. The wheel is adjusted axially to vary the region of engagement of the tapered periphery of the wheel with the cable. One or more adjustments may be made to assure that the length of the cable measured by the counter is the same as the actual length of the cable between the bands. For cable having a conductive sheath, the metal bands may be replaced by insulating bands.

---

This invention relates generally to devices for measuring the length of elongated articles or strip material, for example, cable, and more particularly to a method of and apparatus for calibrating cable measuring devices designed to measure cable length.

In the manufacture of electrical cable, in a typical reeling operation, two takeup reels are placed side by side on a supporting structure and the cable is taken up on one reel and is then taken up on the other reel. When a reel is filled with the required length of cable, the cable is severed and the free end threaded onto the adjacent empty reel. The full reel is now removed and replaced with an empty reel. This procedure is continued until it is desired, or becomes necessary, to halt the production line.

Obviously, it is necessary to continuously measure the length of the cable as it is being taken up on a reel in order that the required length of cable is supplied to a customer. This is generally accomplished by passing the cable under a measuring wheel which engages the cable and which is coupled to some suitable measuring device which records the cable length. Because of slippage between the measuring wheel and the cable, elongation of the cable under tension and variations in the diameter of the cable being produced, such prior art measuring methods may become subject to some inaccuracy. As a result, measurement errors up to the order of one percent may occur. Thus, the actual length of a reel which, for example, is supposed to be 1000 feet in length could be slightly less or greater than that amount. To guard against the possibility of supplying a customer with less cable than he has ordered, it is the practice to provide a short length of additional cable on the reel. The customer is therefore assured that he will receive at least the nominal length of cable and may receive slightly more than the ordered length.

The manufacture of multi-unit cables also presents a problem with respect to the length of the individual units. For example, the manufacture of a cable having 3,000 pairs requires that several smaller units, having 200 pairs each, be twisted together in a rotating twister. The length of the finished cable will be determined by the shortest length of any one of the constituent parts mounted in the twisting apparatus. It is thus essential that the length of each constituent cable component on its respective reel be substantially the same as all other constituent components.

Accordingly, it is an object of this invention to provide an improved method for calibrating a length measuring device.

Another object of this invention is to provide an improved method for calibrating a length measuring device by comparing the measurement of a length of an article against a known standard.

Another object of this invention is to provide an improved method for calibrating a cable measuring device by passing a predetermined length of cable through the measuring device and comparing the actual length of the cable with the indicated length.

Yet another object of this invention is to provide an improved method for calibrating a device for measuring lengths of moving cable by adjusting a cable-engaging measuring wheel having a tapered circumferential periphery in accordance with the difference between the measured length of the cable and its actual length.

Another object of this invention is to provide an improved apparatus for practicing the above methods.

Still another object of the invention is to provide improved apparatus for calibrating a cable-measuring device of the type described, the apparatus having a tapered cable-engaging wheel adjustable along its axis to eliminate measuring errors.

In accordance with one embodiment of the invention, the method comprises the provision of a tapered measuring wheel engaging the cable to be measured. A pair of indicia are placed on a portion of the cable at predetermined spaced-apart locations therealong and the exact distance between the indicia determined in some suitable fashion. The cable is passed through the measuring device and the presence of the indicia are sensed to control the period of operation of a counting circuit connected to the measuring wheel. If there is a discrepancy between the measured length and the actual length of the cable, the tapered measuring wheel is axially adjusted in a direction normal to cable feed so that a different portion of the tapered periphery of the wheel engages the cable thereby increasing or decreasing the effective circumference of the periphery of the wheel. The method is repeated, if necessary, until the actual length of the cable agrees with the measured length.

For practicing the method one embodiment of the invention comprises an apparatus having a tapered measuring wheel engaging the cable. The wheel is axially adjustable in order to vary the effective circumference of the wheel. V-type rollers before and after the measuring wheel act to maintain the cable in fixed engagement with the wheel and a weighted counterbalance causes the measuring wheel to engage the cable with a force which is adequate to prevent slippage, yet which permits the wheel to ride freely on the cable and yield with surface irregularities. A count generating apparatus in coupled to the wheel and the output therefrom fed to a digital counter. A pair of conducting metal tapes are affixed to the cable at predetermined positions therealong and a pair of electrical contactors ride on the surface of the cable and sense the presence of the conductive tapes. This arrangement controls the operation of a relay which determines the period of operation of the digital counter.

A feature of this invention is a tapered measuring wheel axially adjustable so that different portions of its circumferential periphery engage a cable to be measured.

Another feature of this invention is the provision of conducting, insulating, or light-reflective indicia at predetermined spaced-apart locations on a cable to be measured.

The aforementioned and other objects and features of the invention will be apparent from the following detailed description of a specific embodiment thereof when read in conjunction with the accompanied drawings, in which:

FIG. 1 is a perspective view of one embodiment of the apparatus for practicing the method of this invention;

FIG. 2 is a cross-sectional view of the apparatus taken about line AA in FIG. 1;

FIG. 3 is a partially schematic, partially side elevation view of the apparatus of FIG. 1.

The illustrative embodiment of the invention shown herein relates to, and is described with reference to, the measurement of continuous lengths of electrical cable, but it should be understood that the invention is not so limited. For example, it will be obvious to one skilled in the art that the method and apparatus of this invention is applicable to the measurement of many other products such as rope, wire, steel-cable, tubes, pipes, tapes, sheet material, and the like. Whether the actual distance between the tapes is measured before or after the cable is measured by the measuring wheel is not material.

Referring now to FIG. 1, a continuous length of insulated electrical cable 11 passes over first and second pairs of guide rollers 12—12, 13—13. The rollers 12—12 and 13—13 act to restrain the cable from movement out of its feed path and maintain the cable 11 in stable juxtaposition with respect to a measuring wheel 14 which engages the upper surface of the cable 11.

The wheel 14 has a tapered circumferential periphery 16 as best seen in FIGURE 2 and is rotatably mounted on a shaft 17 of an optical tachometer 18. The optical tachometer is fastened to a support rod 19. To minimize slippage between the measuring wheel 14 and the cable 11, the tapered surface 16 is preferably provided with machine engraved rulings to increase the coefficient of friction therebetween.

The rod 19 is connected to a support block 20 which is pivotally mounted within a housing 21 by a shaft 22. The housing 21 is connected by means of a threaded shaft 23 to a block 24 which is slidably mounted on a main support shaft 26. An adjusting nut 27 is rotatably mounted on the block 24 and is adapted to displace the housing 21 in a horizontal plane. The displacement of the housing 21, in turn, axially displaces the measuring wheel 16 in a path normal to the cable 11. This alters the effective cable engaging circumference of the wheel as will be explained herebelow.

The block 24 is restrained from slidable motion along the support shaft 26 by means of a set-screw 28. By loosening the set-screw 28, adjustment of the housing 21 in the vertical plane is possible, if necessary.

The outwardly extending portion of support rod 19 is threaded and receives at its far end a counterbalancing weight 29 which is secured to the rod by a nut 31. The effect of weight 29 is to compensate at least partially for the weight of the wheel 14 and ensure that the wheel 14 is readily yieldable in response to variations of the diameter of the cable 11 or displacement of the wheel 14. This arrangement, however, permits the wheel 14 to ride on the surface of the cable 11 with sufficient force to minimize slippage therebetween.

The optical tachometer 18 is driven by the rotation of the wheel 14 and its output is connected via lead 33 to the input of a digital counter 34 which visually displays the registered count.

An optical tachometer is normally used for measuring the angular velocity of a rotating member, however, in the present case, the tachometer 18 is used as a pulse generator. An optical tachometer is preferred over conventional pulse generating devices because of its low mass and low inertia. However, it is obvious that other suitable devices may be used.

The size of the wheel 14 and hence its means circumference obviously depends on the diameter of the cable 11 to be measured. For a typical electrical cable having a diameter of two inches, the wheel 14 may typically have a circumference of two feet. The optical tachometer 18 will, therefore, be arranged to produce 20 output pulses per revolution. Thus, 10 output pulses will appear on the lead 33 for each foot of the cable 11 which engages the wheel 14. Stated another way, the digital counter 34 will register the length of cable engaging the wheel 14 to within one-tenth of a foot.

A pair of spring-like electrical contacts 36—36 are mounted on an insulating base 37. The contacts 36—36 are connected over leads 38—38 to control apparatus as will be described herebelow.

The contacts 36—36 are forced into spring-like engagement with the cable 11 by means of a rod 39. The rod 39 is slidably mounted on a support 41 which, in turn, is connected to main support shaft 26 by a rod 42. The rod 42 terminates in a cylindrical collar 43 which is passed over the shaft 26 and secured thereto by a set-screw 44. By suitable adjustment of the rods 39 and 42, the pressure of the spring-like contacts 36—36 on the cable 11 can be set to a suitable predetermined value.

A first strip of conductive tape 45 is affixed to the cable 11 at a first position therealong and a second strip of conductive tape 50 is affixed at a second position therealong. As the conductive strips pass under the spring-like contacts 36—36, they complete an electrical circuit to operate a control circuit as will be described.

Referring now to FIG. 2, a cross-sectional view taken along the line AA in FIG. 1, shows in more detail the tapered nature of the circumferential periphery 16 of measuring wheel 14 and the manner of its engagement with the cable 11. As shown in the drawing, the effective circumference of the wheel 14 engaging the cable 11 is its nominal value, typically two feet. As the adjusting nut 27 is turned, the wheel 14 will be displaced to the left or to the right of the cable 11 decreasing or increasing the effective circumference of the wheel 14.

The counterbalancing weight 29 compensates for any vertical displacement of the wheel 14 and acts to maintain the wheel in engagement with the cable 11 at all times. For the wheel previously discussed, the range of effective circumference may vary typically from 2.05 to 1.95 feet. Thus, the optical tachometer will have a corresponding output range of approximately 9.75 pulses per foot to 10.25 pulses per foot. In this manner, an axial adjustment may be made to compensate for slippage between cable 11 and the wheel 14 or for cable stretch caused by the tension of the reeling apparatus. This compensation ensures that the resultant, effective generator pulse rate is 10 pulses for each actual foot of cable passing under the wheel 14.

Referring to FIG. 3, one of the pair of contacts 36—36 is connected over one of the pair of leads 38—38 to a first terminal 46 of a DC power source 48. The other of the pair of contacts 36—36 is connected via the armature winding of an impulse sequencing relay 49 to a second terminal 47 of the power source 48. An input sequencing relay is especially suitable for single coil latching. The contact arrangement is switched alternately on and off by means of a multi-lobed cam. A pair of contacts 52—52 on relay 49 are connected via the control leads 53—53 to the digital counter 34. The counter 34 is operable to count the pulses appearing on the lead 33 only when contacts 52—52 are closed. Power for the digital counter 34 is supplied from DC source 48 over power leads 51—51.

When the cable 11 is set in motion under the wheel 14, the first conductive tape 45 bridges the contacts 36—36 and current flows from terminal 46 of DC source 48 through one of the leads 38—38, one of the contacts 36—36, the conductive tape 45, the other one of the contacts 36—36, the other one of the leads 38—38, the armature winding of the relay 49 and back to the terminal 47 of the source 48. The relay 49 is thus operated and contacts 52—52 close, placing a short across the control leads 53—53 thus permitting the digital counter 34 to register the pulses appearing on the lead 33 from the tachometer 18.

The appearance of the second conductive tape 50 under the contacts 36—36 similarly energizes the armature winding of the relay 49. However, the relay contacts 52—52 which are now open inhibit further operation of the counter 34.

In operation, the cable 11 is threaded through rollers 12—12 and 13—13 and initial adjustments are made to the block 24 to ensure that the wheel 14 is in a proper position to engage the cable 11. Typically, the optimum position will be when the rod 19 is in a substantially horizontal position. Adjustment is then made to the counterbalance weight 29 so that the wheel 14 engages the cable 11 with sufficient force to prevent slippage therebetween. Typically, one or two pounds of force is sufficient. This, however, depends on the nature of the cable and its surface.

Conductive tapes 45 and 50 are then applied to the cable 11 at two separate locations, neither of which have yet passed under the measuring wheel 14. Typically, the distance separating the two tapes will be selected to be 100 feet. As will be appreciated the greater the separation between the tapes the greater is the accuracy of calibration. The conductive tapes 45 and 50 may be of the self-adhesive type or may be affixed to the surface of the cable 11 by some suitable adhesive such as epoxy cement.

The precise distance between the conductive tapes 45 and 50 is now measured using a precision steel rule or the like and the figure thus obtained carefully recorded. The power source 48 is energized and the digital counter 34 reset to zero.

The cable 11 is then fed through the rollers 12—12 and 13—13 and the friction between the cable 11 and the wheel 14 causes the wheel 14 to rotate. The rotation of the wheel 14 rotates the shaft 17 of the optical tachometer 18 causing the tachometer 18 to generate pulses which are coupled over the lead 33 to the input of the digital counter 34. The digital counter 34 does not register these pulses at this time, however, as the contacts 52—52 of the relay 49 are open.

When the leading edge of the conductive tape 45 passes under the contacts 36—36, it completes a circuit from the power source to the relay 49 and the contacts 52—52 close. This closure starts the operation of the counter 34, which now begins to register the pulses from the optical tachometer 18. When the trailing edge of the tape 45 passes under the contacts 36—36, the circuit from the power source 48 to the relay 49 is broken and the relay de-energized. Because the contacts 52—52 remain closed since relay 49 is of the impulse sequencing type, the counter 34 continues to register the incoming pulses from the tachometer 18.

When the second conductive tape 50 passes under the contacts 36—36, the relay 49 is re-energized and the relay contacts 52—52 open, inhibiting the counter 34 from registering further pulses from the tachometer 18.

The reading on the counter 34 is now compared with the previously noted distance between the conductive tapes 45 and 50. If the indicated reading on the counter 34 is higher than the actual distance between the tapes 45 and 50, as will be the case if the cable is being stretched under reeling tension, then adjusting nut 27 is varied so that the effective circumference of the wheel is increased to compensate for the elongation of the cable 11. In a similar manner, if the indicated reading on the counter 34 is lower than the actual distance between the tapes 45 and 50, as will be the case where slippage is occurring, the wheel 14 is similarly displaced to decrease the effective circumference engaging the cable 11.

Once an adjustment has been made, the above steps are repeated until the indicated reading agrees with the actual distance between the tapes 45 and 50.

Depending on the distance selected between the two tapes and the accuracy of the digital counter and optical tachometer, it will be obvious that this invention permits the measurement of a continuous length of cable to an accuracy well within one-tenth of one percent, a substantial improvement over the prior art.

If the cable to be measured is itself conductive or has a conductive metal sheath thereabout, the conductive tapes are replaced with insulating tapes and a minor modification made to the relay 49 by replacing the normally open contacts 52—52 by a pair of normally closed contacts. It is clear also that other types of sensing devices may be employed in lieu of contacts 36—36. For example, the tapes 45 and 50 may be light-reflective tapes and can be sensed by projecting a beam of light onto cable 11 and providing a photoelectric sensing device coupled to the relay 49. If the cable 11 is itself reflective the tapes 45 and 50 may be light absorbtive and the above-described modification made to the contacts 52—52 of the relay 49.

It is believed that the operation of the above-described method and apparatus will be apparent from the foregoing description. While the method and apparatus has been described as being suitable for the calibration of a device for measuring continuous lengths of cable, it will be obvious that various changes and modifications may be made therein without departing from the spirit and scope of the invention.

What is claimed is:

1. A method of calibrating a counter in a device for measuring the length of an insulated cable comprising the steps of:

applying a pair of conductive elements at predetermined spaced-apart locations on the cable, measuring the actual length of the cable between said spaced-apart locations, providing a measuring wheel associated with the counter, the wheel having a tapered peripheral surface for engagement with the cable, advancing said cable whereby the passage of the first conductive element beneath a contact means initiates a count and the passage of the second conductive element beneath the contact means terminates the count, comparing the count registered by the counter with the actual length of the cable, adjusting said measuring wheel along its axis if said registered count differs from said actual length to vary the circumferential peripheral surface engaging the cable, and repeating the above steps, if necessary, until said registered count is the same as said actual length.

2. A method of calibrating a counter in a device for measuring the length of a cable having a conductive outer sheath comprising the steps of:

applying a pair of insulating elements at predetermined spaced-apart locations on the cable, measuring the actual length of the cable between said spaced-apart locations, providing a measuring wheel associated with the counter, the wheel having a tapered peripheral surface for engagement with the cable, advancing said cable whereby the passage of the first insulating element beneath a contact means initiates a count and the passage of the second insulating element beneath the contact means terminates the count, comparing the count registered by the counter with the actual length of the cable between said spaced-apart locations, adjusting said measuring wheel along its axis if said registered count differs from said actual length to vary the circumferential peripheral surface engaging the cable, and repeating the above steps, if necessary, until said registered count is the same as said actual length.

3. A method of calibrating a counting wheel having a tapered periphery and which engages a moving cable for measurement thereof, comprising the steps of:
- applying indicia to the cable prior to its passage beneath the counting wheel, each indicium having a predetermined spaced-apart relationship with the other,
- registering the output of said counting wheel in response to the passage of said indicia past a sensing detector,
- comparing said registered output with said predetermined spaced-apart relationship to produce an error indication, and
- physically displacing said counting wheel with respect to said cable so that a different part of said tapered peripheral surface engages said cable to minimize said error indication.

4. An apparatus for calibrating a cable measuring device for measuring lengths of moving cable wherein first and second indicia are provided at predetermined locations on a cable comprising, in combination:
- a measuring wheel having a tapered, circumferential, peripheral surface for engaging said cable,
- counterbalancing means for causing said wheel to engage said cable with a predetermined force,
- means responsive to the rotation of said measuring wheel for generating an electrical signal,
- means for registering said electrical signal to indicate the length of cable that has engaged said wheel,
- means responsive to the passage of the indicia on the cable past a reference point for controlling the period of operation of said registering means, and
- means for moving said measuring wheel with respect to said cable to compensate for any difference between the indicated cable length and the distance between said predetermined locations.

5. An apparatus for calibrating a cable measuring device for measuring lengths of moving cable wherein first and second conductive elements are provided at predetermined spaced-apart locations on a cable comprising:
- a wheel having a tapered, circumferential periphery engaging said cable to translate linear motion of said cable into angular motion of said wheel,
- a counter-balance connected to said wheel whereby the wheel engages the cable with a predetermined force to minimize slippage between the cable and the wheel,
- generating means, responsive to the angular motion of said wheel, for producing a train of output pulses,
- a counter for registering said output pulses to indicate the amount of linear motion of said cable,
- means responsive to the passage of said first and second conductive elements thereunder, for first initiating a count on said counter and secondly, terminating the count on said counter, and
- adjustment means for altering that portion of the circumferential periphery of said wheel which contacts the cable.

6. An apparatus for calibrating a measuring device for measuring lengths of moving cable wherein first and second elements are provided at predetermined spaced-apart locations on a cable comprising:
- a wheel having a tapered, circumferential periphery engaging said cable to translate linear motion of said cable into angular motion of said wheel,
- a counter-balance connected to said wheel whereby the wheel engages the cable with a predetermined pressure to minimize slippage between the cable and the wheel,
- generating means responsive to the angular motion of said wheel, for producing a train of output pulses,
- a counter for registering said output pulses to indicate the amount of linear motion of said cable,
- means responsive to the passage of said first and second elements thereunder, for first initiating a count on said counter and secondly, terminating the count on said counter, and
- adjustment means for altering that portion of the circumferential periphery of said wheel which contacts the cable.

7. The method of calibrating a device for measuring the length of moving material substantially circular in cross section comprising:
- providing a measuring device including a wheel having a tapered peripheral surface in contact with the material,
- determining the actual length of the material between selected points of the material,
- providing a measuring control means at each of said points on the material,
- measuring the distance between the points of the moving material by means of the measuring device in response to the operation of each control means,
- comparing the length measured by the measuring device with the actual length, and
- adjusting the wheel axially to vary the effective peripheral surface thereof in engagement with the material to compensate for any difference between the measured length and the actual length of the material.

References Cited
UNITED STATES PATENTS

| | | | |
|---|---|---|---|
| 1,829,318 | 10/1931 | Walen | 33—129 |
| 2,514,437 | 7/1950 | Bailhe | 40—316 |
| 2,876,549 | 3/1959 | Adamson et al. | 33—129 |
| 3,120,118 | 2/1964 | Boyle | 73—3 |
| 3,058,223 | 10/1962 | Schmidt et al. | 33—129 |

LOUIS R. PRINCE, *Primary Examiner.*

J. W. ROSKOS, *Assistant Examiner.*

U.S. Cl. X.R.

33—129